US010790691B2

(12) United States Patent
Govindaraj et al.

(10) Patent No.: US 10,790,691 B2
(45) Date of Patent: Sep. 29, 2020

(54) IN SYSTEM RECONFIGURABLE RECTIFIER/POWER CONVERTERS FOR WIRED AND WIRELESS CHARGING

(71) Applicant: QUALCOMM Incorporated, San Diego, CA (US)

(72) Inventors: Arvind Govindaraj, San Diego, CA (US); Sumukh Shevde, Carlsbad, CA (US); Joseph Maalouf, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 766 days.

(21) Appl. No.: 15/471,521

(22) Filed: Mar. 28, 2017

(65) Prior Publication Data
US 2018/0287405 A1    Oct. 4, 2018

(51) Int. Cl.
H02J 7/00       (2006.01)
H02J 7/02       (2016.01)
H02M 3/158      (2006.01)
H02M 1/44       (2007.01)
H02J 50/10      (2016.01)
H02M 1/10       (2006.01)
H02J 50/12      (2016.01)

(52) U.S. Cl.
CPC .............. H02J 7/025 (2013.01); H02J 50/10 (2016.02); H02J 50/12 (2016.02); H02M 1/10 (2013.01); H02M 1/44 (2013.01); H02M 3/158 (2013.01); H02J 7/00 (2013.01); H02J 2207/20 (2020.01); H02J 2207/40 (2020.01); Y02B 40/90 (2013.01)

(58) Field of Classification Search
USPC .......................................................... 320/108
See application file for complete search history.

(56) References Cited

U.S. PATENT DOCUMENTS

| 4,540,946 | A  | * | 9/1985 | Sainz ................. H03H 11/1291 |
|           |    |   |        | 327/45 |
| 9,231,431 | B2 | * | 1/2016 | Kim .......................... H02J 7/04 |
| 9,381,821 | B2 |   | 7/2016 | Keeling et al. |
| 2011/0156636 | A1 |   | 6/2011 | Kim |
| 2014/0225558 | A1 |   | 8/2014 | Park |
| 2015/0054454 | A1 | * | 2/2015 | White, II ............. H04B 5/0075 |
|           |    |   |        | 320/108 |

(Continued)

OTHER PUBLICATIONS

International Search Report and Written Opinion—PCT/US2018/020376—ISA/EPO—dated May 9, 2018.

Primary Examiner — Samuel Berhanu
(74) Attorney, Agent, or Firm — Hunter Clark PLLC

(57) ABSTRACT

Techniques for wired and wireless charging of electronic devices are provided. An example of a method for charging a device according to the disclosure includes receiving a signal from a power source with an electronic circuit, such that the electronic circuit includes a synchronous rectifier comprising a first phase leg and a second phase leg, utilizing the first phase leg to implement synchronous rectification and the second phase leg to implement a single phase buck converter when the signal is a wireless signal received from the power source, utilizing the first phase leg and the second phase leg to implement a multi-phase buck converter when the signal is received from a wired power source, and providing an output signal with the electronic circuit.

23 Claims, 9 Drawing Sheets

(56) References Cited

U.S. PATENT DOCUMENTS

| | | | |
|---|---|---|---|
| 2016/0087472 A1* | 3/2016 | Sattinger | H02J 7/0055 320/108 |
| 2016/0099593 A1* | 4/2016 | Lim | H02J 7/0055 320/114 |
| 2016/0156216 A1 | 6/2016 | Nakao | |

* cited by examiner

IN SYSTEM RECONFIGURABLE RECTIFIER/POWER CONVERTERS FOR WIRED AND WIRELESS CHARGING

FIELD

This application is generally related to power charging of chargeable devices, and more particularly to providing wired and wireless charging to a device.

BACKGROUND

A variety of electrical and electronic devices are powered via rechargeable batteries. Such devices include electric vehicles, mobile phones, portable music players, laptop computers, tablet computers, computer peripheral devices, communication devices (e.g., Bluetooth devices), digital cameras, hearing aids, and the like. Rechargeable devices may be charged via wired connections through cables or other similar connectors that are physically connected to a power supply. Wireless charging systems are also being used to transfer power in free space to be used to charge rechargeable electronic devices or provide power to electronic devices. Many devices are configured to accommodate both wired and wireless charging options. Generally, wired charging is capable of providing higher power as compared to the wireless option. A single device may include two separate power converter chains for wired (e.g., DC/DC converters) and wireless power (e.g., a rectifier in combination with DC/DC converters) implementations respectively. Using two separate circuits for wired and wireless charging may lead to inefficient usage of chip area which has direct area and cost implications.

SUMMARY

An example of an apparatus for converting an input from a wireless or wired power source according to the disclosure includes a wireless receiving element, a direct current (DC) input, a first phase leg operably coupled to the wireless receiving element and the DC input, such that the first phase leg includes one or more switches and a first inductor, a second phase leg operably coupled to the first phase leg, such that the second phase leg includes one or more switches and a second inductor, an output operably coupled to the second phase leg, a control element operably coupled to the first phase leg and the second phase leg, the control element is configured to utilize the one or more switches in the first phase leg to rectify a signal received via the wireless receiving element, and utilize the one or more switches in the second phase leg to perform a DC-to-DC conversion of the rectified signal, and utilize the one or more switches in the first phase leg and the second phase leg to perform the DC-to-DC conversion of a DC signal received via the DC input.

Implementations of the apparatus may include one or more of the following features. A filter element may be operably coupled to the wireless receiving element and the first phase leg. The first phase leg may be driven to operate at a switching frequency and the filter element may be configured to provide a high impedance at the switching frequency. The filter element may include one or more variable reactive elements. The control element may be operably coupled to the filter element and configured to vary an impedance value of the one or more variable reactive elements. The control element may be operably coupled to the wireless receiving element and the DC input and may be configured to determine if the input is a wireless input or a wired input. A wireless power input may be received at a power transfer frequency and the control element may be configured to drive the one or more switches at a switching frequency that is approximately equal to the power transfer frequency. The output may be a battery and the control element is configured to utilize the one or more switches in the first phase leg and the second phase leg as a boost converter to provide a power signal to the DC input. The first inductor and the second inductor may be implemented as a coupled inductor.

An example of a method for providing an output from a circuit according to the disclosure includes receiving a signal from a power source with an electronic circuit, such that the electronic circuit includes a synchronous rectifier comprising a first phase leg and a second phase leg, utilizing the first phase leg to implement synchronous rectification and the second phase leg to implement a single phase buck converter when the signal is a wireless signal received from the power source, utilizing the first phase leg and the second phase leg to implement a multi-phase buck converter when the signal is received from a wired power source, and providing an output signal with the electronic circuit.

Implementations of such a method may include one or more of the following features. The method may include detecting if the power source is a wireless power source or the wired power source. The electronic circuit may configured to receive the wireless signal at a power transfer frequency and utilizing the first phase leg and the second phase leg to implement the multi-phase buck converter comprises operating one or more switches at a switching frequency that is approximately equal to the power transfer frequency. The first phase leg or the second phase leg may implement the single phase buck converter when the signal is received from the wired power source.

An example of an apparatus for converting an input from a wireless or wired power source according to the disclosure includes a wireless receiving element, a direct current (DC) input, a first phase leg operably coupled to the wireless receiving element and the DC input, such that the first phase leg includes one or more switches and a first inductor, a second phase leg operably coupled to the first phase leg, such that the second phase leg includes one or more switches and a second inductor, a third phase leg operably coupled to the first phase leg, such that the third phase leg includes one or more switches and a third inductor, an output operably coupled to the first, second and third phase legs, a control element operably coupled to the first, second and third phase legs, wherein the control element is configured to utilize the one or more switches in the first phase leg and the second phase leg to rectify a signal received via the wireless receiving element, and utilize the one or more switches in the third phase leg to perform a DC-to-DC conversion of the rectified signal, and utilize the one or more switches in the first, second and third phase legs to perform the DC-to-DC conversion of a DC signal received via the DC input. The control element may be operably coupled to the wireless receiving element and the DC input and configured to determine if the input is a wireless input or a wired input. The signal received via the wireless receiving element may be received at a power transfer frequency and the control element may be configured to drive the one or more switches at a switching frequency that is approximately equal to the power transfer frequency. The output may be a battery and the control element may be configured to utilize the one or more switches in the first, second or third phase legs as a boost converter to provide a power signal to the DC input.

The one or more switches in only one of the first, second and third phase legs may be utilized to perform the DC-to-DC conversion of the DC signal received via the DC input. The one or more switches in only two of the first, second and third phase legs may be utilized to perform the DC-to-DC conversion of the DC signal received via the DC input.

An example of an apparatus according to the disclosure includes means for receiving a signal from a power source with an electronic circuit, such that the electronic circuit includes a rectifier means comprising a first phase leg and a second phase leg, means for utilizing the first phase leg to implement synchronous rectification and the second phase leg to implement a single phase buck converter when the signal is a wireless signal received from the power source, means for utilizing the first phase leg and the second phase leg to implement a multi-phase buck converter when the signal is received from a wired power source, and means for providing an output signal with the electronic circuit.

Items and/or techniques described herein may provide one or more of the following capabilities, as well as other capabilities not mentioned. An electric circuit may receive power from a wireless base station or a direct wired input. The electronic circuit may include one or more switches configured to perform synchronous rectification. The switches may be configured in one or more phase legs. Half-bridge and full-bridge rectification of a received wireless power signal may be realized. In a half-bridge circuit topology, in a wireless mode, one phase leg may be utilized to rectify the power signal and the other phase implements a single phase buck converter. In the wired mode, both phases implement a multi-phase buck converter. The switching frequency may be approximately equal to the wireless power transfer frequency. In a full-bridge topology, two phase legs may be used for rectification in wireless mode. The electric circuit may be used in reverse to implement a boost converter to provide power from a battery to a peripheral port (e.g., USB). Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Techniques are discussed herein for providing wired and wireless power transfer to an electronic device. Wired power transfer may refer to coupling the electronic device to a direct current (DC) power source with a physical electrical conductor. Wireless power transfer may refer to transferring any form of energy associated with electric fields, magnetic fields, electromagnetic fields, or otherwise from a transmitter to a receiver without physical electrical conductors attached to and connecting the transmitter to the receiver to deliver the power (e.g., power may be transferred through free space). The power output into a wireless field (e.g., a magnetic field or an electromagnetic field) may be received, captured by, or coupled to by a power receiving element to achieve power transfer. The transmitter transfers power to the receiver through a wireless coupling of the transmitter and receiver.

The output power of a receiver in a wireless power transfer may be regulated by varying the reactance of a resonant network (i.e., resonant circuit) within the receiver. In an example, tuning the resonant network closer to resonance or further away from resonance may be used to control the output power efficiently without using DC-DC power converters fed by a rectifier in the receiver. Electronic devices with wireless charging capabilities generally also include a wired charging mechanism. For example, an electric device may be configured to receive power via a wireless system (i.e., charging pad), or through a wired system (i.e., DC or USB input). In a typical configuration, the electronic device may include two separate power paths to charge/operate the device. For example, the wireless path may include a circuit with a pick-up coil to provide an AC signal to rectification circuitry and other power electronics to provide power (e.g., charge a battery). There may also be completely separate circuitry to provide a path the wired charging (e.g., USB, DC input, or other wired power sources). Utilizing two separate circuits for wired and wireless power is inefficient from cost and integration perspectives. The circuit topologies described herein overcome this limitation because power receiving circuits/hardware elements are shared between the wireless and wired power inputs.

Figure 1:
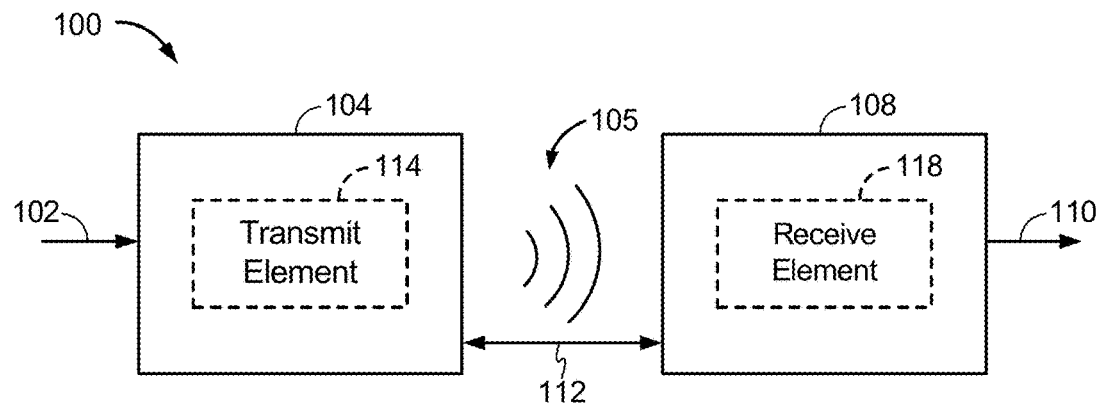
FIG. 1 is a functional block diagram of an exemplary wireless power transfer system.

FIG. 1 is a functional block diagram of an example of a wireless power transfer system 100. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) that is coupled to receive the output power 110. The transmitter 104 and the receiver 108 are separated by a non-zero distance 112. The transmitter 104 includes a power transmitting element 114 configured to transmit/couple energy to the receiver 108. The receiver 108 includes a power receiving element 118 configured to receive or capture/couple energy transmitted from the transmitter 104.

The transmitter 104 and the receiver 108 may be configured according to a mutual resonant relationship. When the resonant frequency of the receiver 108 and the resonant frequency of the transmitter 104 are substantially the same, transmission losses between the transmitter 104 and the receiver 108 are reduced compared to the resonant frequencies not being substantially the same. As such, wireless power transfer may be provided over larger distances when the resonant frequencies are substantially the same. Resonant inductive coupling techniques allow for improved efficiency and power transfer over various distances and with a variety of inductive power transmitting and receiving element configurations.

The wireless field 105 may correspond to the near field of the transmitter 104. The near field corresponds to a region in which there are strong reactive fields resulting from currents and charges in the power transmitting element 114 that do not significantly radiate power away from the power transmitting element 114. The near field may correspond to a region that up to about one wavelength, of the power transmitting element 114. Efficient energy transfer may occur by coupling a large portion of the energy in the wireless field 105 to the power receiving element 118 rather than propagating most of the energy in an electromagnetic wave to the far field.

The transmitter 104 may output a time-varying magnetic (or electromagnetic) field with a frequency corresponding to the resonant frequency of the power transmitting element 114. When the receiver 108 is within the wireless field 105, the time-varying magnetic (or electromagnetic) field may induce a current in the power receiving element 118. As described above, with the power receiving element 118 configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge an energy storage device (e.g., a battery) or to power a load.

Figure 2:
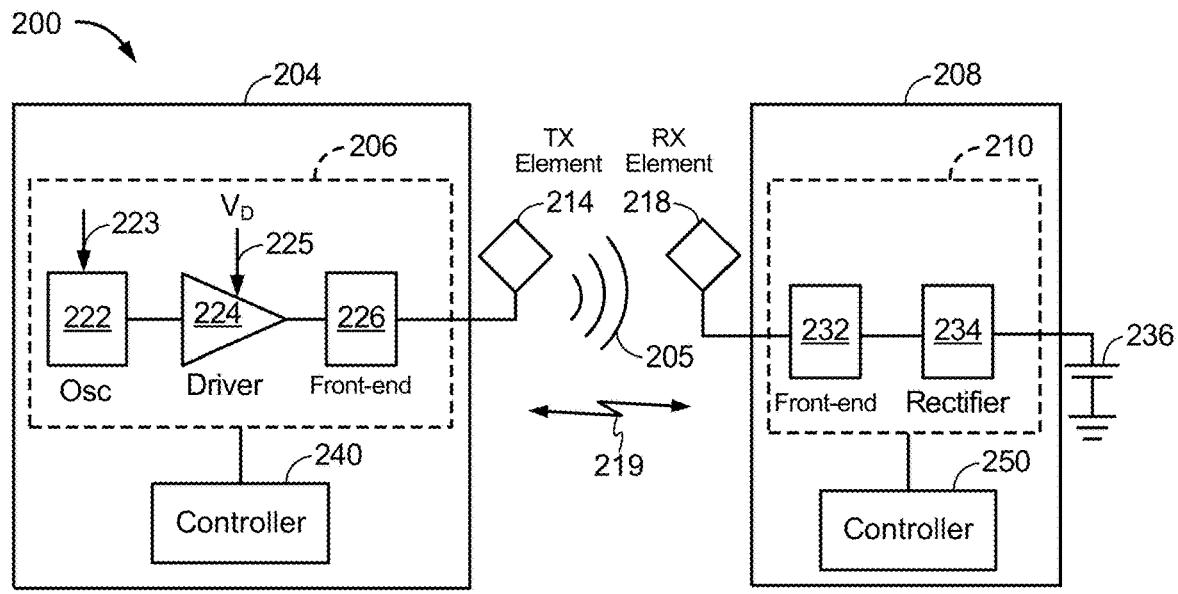
FIG. 2 is a functional block diagram of an example of another wireless power transfer system.

FIG. 2 is a functional block diagram of an example of a wireless power transfer system 200. The system 200 includes a transmitter 204 and a receiver 208. The transmitter 204 (e.g., PTU) is configured to provide power to a power transmitting element 214 that is configured to transmit power wirelessly to a power receiving element 218 that is configured to receive power from the power transmitting element 214 and to provide power to the receiver 208. Despite their names, the power transmitting element 214 and the power transmitting element 218, being passive elements, may transmit and receive power and communications.

The transmitter 204 includes the power transmitting element 214, transmit circuitry 206 that includes an oscillator 222, a driver circuit 224, and a front-end circuit 226. The power transmitting element 214 is shown outside the transmitter 204 to facilitate illustration of wireless power transfer using the power transmitting element 218. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a class-E amplifier or other amplifier (e.g., configured to receive a square wave from the oscillator 222 and output a sine wave).

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless signal (field) 205 to wirelessly output power at a level sufficient for charging a battery 236, or powering a load.

The transmitter 204 further includes a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by the controller 240. The transmitter 204 may further include a memory (not shown) configured to store data, for example, such as instructions for causing the controller 240 to perform particular functions, such as those related to management of wireless power transfer.

Figure 3:
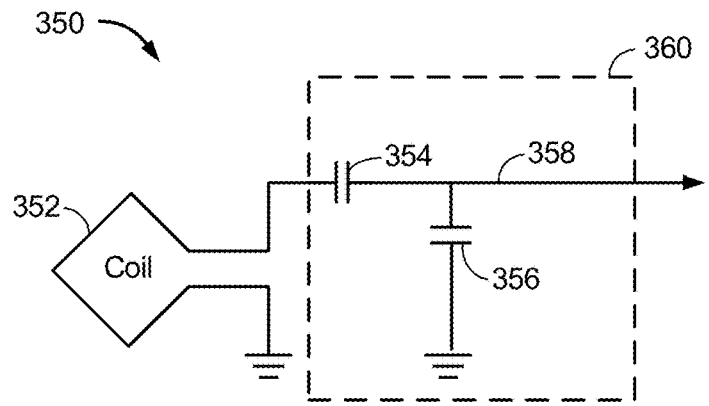
FIG. 3 is a schematic diagram of a portion of transmit circuitry or receive circuitry of FIG. 2 including a transmit or receive element.

The receiver 208 (e.g., a wireless power receiving unit (PRU)) includes the power receiving element 218, and receive circuitry 210 that includes a front-end circuit 232 and a rectifier circuit 234. The rectifier circuit 234 generally includes high speed switches such as metal-oxide semiconductor field-effect transistors (MOSFETS) in a half-bridge or full-bridge topology. The power receiving element 218 is shown outside the receiver 208 to facilitate illustration of wireless power transfer using the power receiving element 218. The front-end circuit 232 may include matching circuitry configured to match the impedance of the receive circuitry 210 to the impedance of the power receiving element 218. As will be explained below, the front-end circuit 232 may further include a tuning circuit to create a resonant circuit within the power receiving element 218. The rectifier circuit 234 may generate a DC power output from an AC power input to charge the battery 236, as shown in FIG. 3. The receiver 208 and the transmitter 204 may additionally communicate on a separate communication channel 219 (e.g., BLUETOOTH, ZIGBEE, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. The transmitter 204 may be configured to generate a predominantly non-radiative field with a direct field coupling coefficient (k) for providing energy transfer. The receiver 208 may directly couple to a wireless signal such as the wireless field 205 and generate an output power for storing or consumption by a battery (or load) 236 coupled to the output or receive circuitry 210. In this example, the generated output power is associated with the resonant circuit in the front end 232 because the tuning of the resonant circuit will impact the amount of output power generated.

The receiver 208 further includes a controller 250 that may be configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to try to minimize transmission losses between the transmitter 204 and the receiver 208.

FIG. 3 is a schematic diagram of an example of a portion of the transmit circuitry 206 or the receive circuitry 210 of FIG. 2. While a coil, and thus an inductive system, is shown in FIG. 3, other types of systems, such as capacitive systems for coupling power, may be used, with the coil replaced with an appropriate power transfer (e.g., transmit and/or receive) element. As illustrated in FIG. 3, transmit or receive circuitry 350 includes a power transmitting or receiving element 352 and a tuning circuit 360. The power transmitting or receiving element 352 may also be referred to or be configured as an antenna such as a "loop" antenna. The term "antenna" generally refers to a component that may wirelessly output energy for reception by another antenna and that may receive wireless energy from another antenna. The power transmitting or receiving element 352 may also be referred to herein or be configured as a "magnetic" antenna, such as an induction coil (as shown), a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356, which may be added to the transmit or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. For example, the tuning circuit in the front-end circuit 226 may have the same design (e.g., 360) as the tuning circuit in the front-end circuit 232. Alternatively, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

Figure 4:
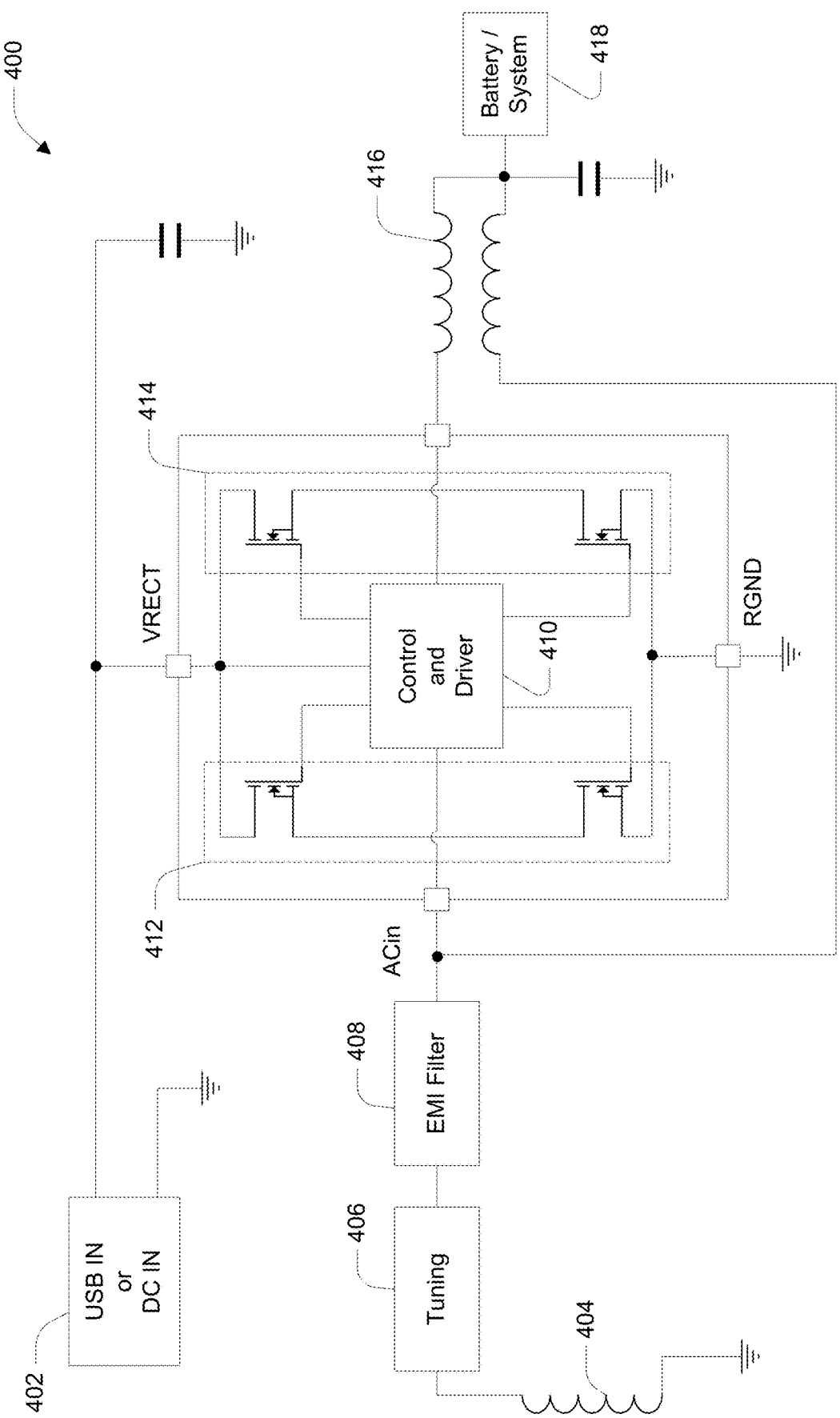
FIG. 4 is a simplified overview of a reconfigurable synchronous rectifier for wired and wireless charging.

Referring to FIG. 4, an overview of an example electronic circuit 400 with a reconfigurable synchronous rectifier for wired and wireless charging is shown. The electronic circuit 400 is an example of a receiver 208 configured to receive wired and wireless power inputs. The circuit 400 includes a wired input element 402 and a wireless receive element 404. The wired input element 402 is configured to receive a direct current (DC) input (e.g., DC in, USB, etc.) and may be operably coupled to a control and driver element 410. The wireless receive element 404 may be part of a tuning element 406 and is coupled to an Electromagnetic Interference (EMI) filter element 408. The output of the EMI filter element 408 provides an alternating-current (AC) to a network of switches controlled by the control and driver element 410. The control and driver element 410 is operably coupled to the network of switches (e.g., MOSFETS, transistors, relays, and other switch technologies) arranged in a first phase leg 412 and a second phase leg 414. The output of the electronic circuit 400 may include a coupled inductor 416 and is configured to provide a DC output to a load such as a battery 418. The control and driver element 410 and the first and second phase legs 412, 414 are a conceptual example of a multi-phase DC-DC converter (e.g., a multi-phase buck converter). The control and driver element 410 may be implemented as an Application Specific Integrated Circuit (ASIC), a system-on-chip (SoC), or other processing circuit configured to drive the switches based on detected inputs. In operation, electronic circuit 400 provides a power electronics topology that is a DC-DC converter when using the wired input element 402 and a wireless path with the wireless receive element 404, the associated tuning element 406, and the EMI filter element 408. Both the wired and wireless inputs utilize the same circuit topology. The EMI filter element 408 may be designed based on the operating frequency of the wireless power transfer system and to provide high impedance at the fundamental frequency and harmonics of the DC-DC converter while providing low impedance at the wireless power transfer frequency.

The circuit 400 provides a DC output from either a wired input (i.e., via the wired input element 402) or a wireless input (i.e., via the wireless receive element 404) without the use of a mechanical interconnect between the two inputs. In a wireless mode, the first phase leg 412 is used to implement a synchronous rectifier and the second phase leg 414 is used to implement a single phase buck converter. In a wired mode, two phase legs 412, 414 are used to implement a multi-phase buck converter. Since the two inputs are not mechanically isolated with a switch, the switching frequency of the control and driver element 410 during DC-DC conversion may be close to design value for the EMI filter element 408 (e.g., +/−1 MHz). In an example, DC/DC switching frequency may be above the wireless power transfer frequency and the EMI filter element may include a corresponding Low Pass Filter (LPF) EMI filter. In another example, the DC/DC switching frequency may be lower than the wireless power transfer frequency and additional filtering elements may be added if an EMI problem exists. The operation of the circuit 400 may also be reversed such that a DC output may be provided to the wired input element 402. For example, control and driver element 410 may be configured to utilize the first and second phase legs 412, 414 to perform a DC-DC conversion on the battery 418 voltage (e.g., acting like a boost DC/DC converter) to provide a voltage to the USB port (e.g., wired input element 402). The control and driver element 410 is an example of a control element and a means for utilizing one or more switches in the first phase leg 412 to rectify a signal received via a wireless receiving coil element, and utilizing one or more switches in the second phase leg 414 to perform a DC-to-DC conversion of the rectified signal. The control and driver element 410 may also be a means for utilizing one or more switches in the first phase leg 412 and the second phase leg 414 to perform a DC-to-DC conversion of a DC signal received via a DC input.

Figure 5:
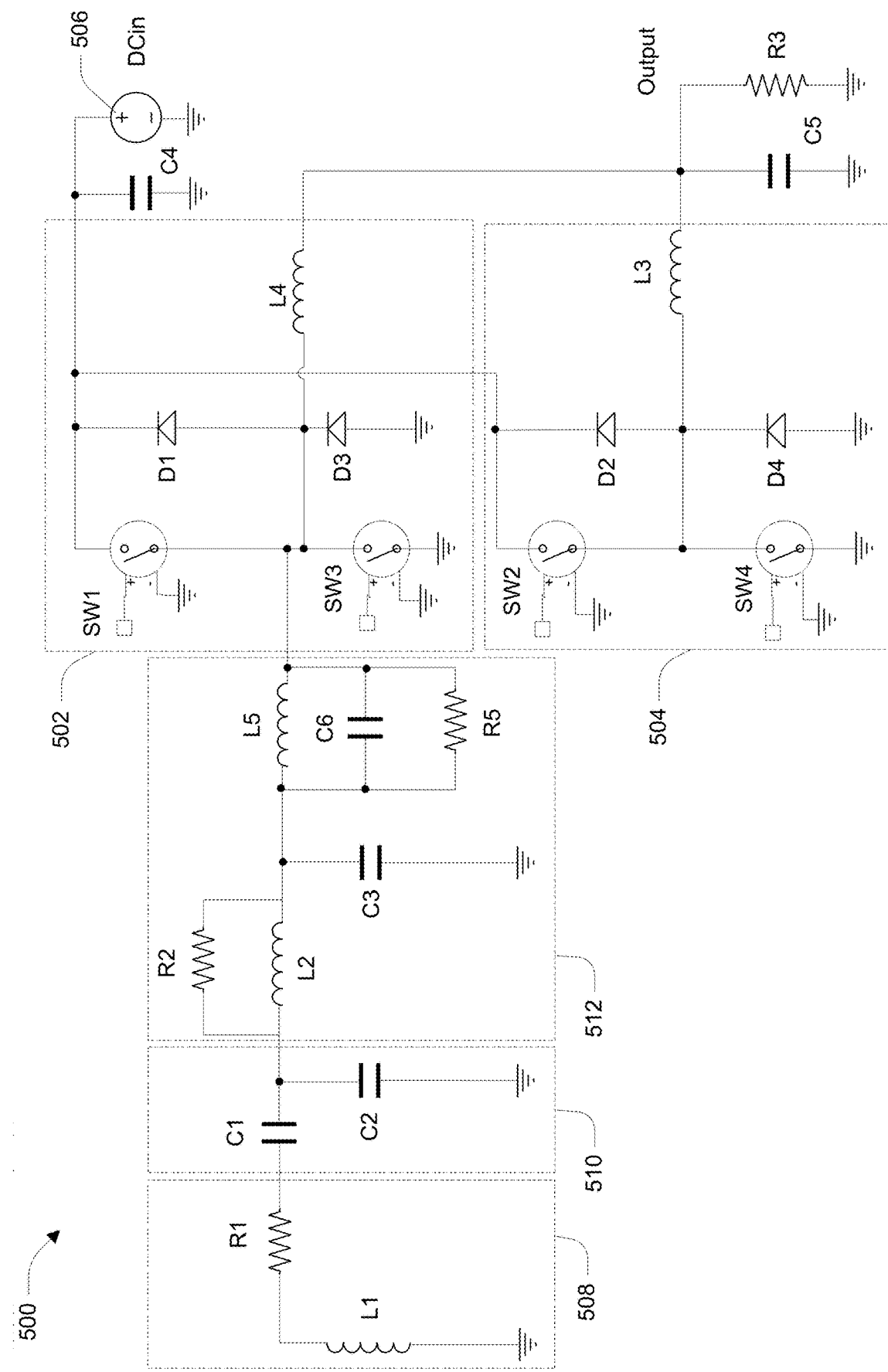
FIG. 5 is a schematic diagram of an example a half-bridge rectifier for wired and wireless charging.

Referring to FIG. 5, with further reference to FIGS. 2-4, a schematic diagram of an example half-bridge rectifier circuit 500 for wired and wireless charging is shown. The circuit 500 may be included in a receiver 208. The circuit 500 provides a two phase legged DC-DC power converter solution with a first phase leg 502 as one top switch (i.e., SW1, D1, SW3, D3, L4) and a second phase leg 504 as one bottom switch (i.e., SW2, D2, SW4, D4, L3). The first phase leg 502 and the second leg phase 504 are a multi-phase buck converter configured to perform DC-to-DC conversion. The switches SW1, SW2, SW3, SW4 may be MOSFETs or other switch devices operably coupled to a control element (e.g., the control and driver element 410) and driven at a switching frequency. The circuit 500 also includes a DC input 506, a wireless receiving element 508, a tuning element 510, and a filter element 512. The circuit 500 is a generalized circuit model to demonstrate the operation of a reconfigurable rectifier for wired and wireless charging. Other circuits and components may be used. The specifications of the components in the circuit 500 may vary based on the application and the corresponding power output expectations. The wireless receiving element 508 may be modeled as a first inductance L1 and a first resistance R1. The values of L1 and R1 may be based on the design of the receive coil 218 used. The tuning element 510 includes one or more capacitive elements such as capacitors C1, C2. Other capacitive elements such as variable capacitors, varactors, transcaps, and barium strontium titanate (BST) devices may be used. The filter element 512 may be an EMI filter including a low pass filter component (R2, L2, C3) and a notch filter component (L5, C6, R5). The design of filter element 512 is based on the switching frequency in the phase legs 502, 504 of the DC-DC power converter. The filter element 512 presents a high impedance to the fundamental and harmonics of the DC/DC converter switching frequency to avoid EMI problems as well as reduce losses in the front-end (508, 510) when receiving power from the DC input 506. In an example, the filter element 512 may include one or more variable reactive elements (e.g., variable capacitors, resisters, inductors) that are operably coupled to the control and driver element 410. The control and driver element 410 may be configured to control the impedance of the filter element based on a desired switching frequency. The circuit includes two smoothing capacitors C4, C5 on the DC input and output respectively. The values and configurations of the elements in the circuit 500 may vary based on application requirements (e.g., power transfer frequency, power output, coil size, etc.). An example of the circuit 500 in a consumer product may be configured to use a power transfer frequency of 6.7 MHz and a DC-DC switching frequency of 3 MHz. The high impedance inductors L3, L4 may be in the range of 1-100 microhenries, and the notch filter may include a 55 nanohenry inductor (L5), a 51.17 nanofarad capacitor (C6) and a 100 ohm resistor (R5).

During wireless operation, the first phase leg 502 performs as a half-bridge rectifier, and the second phase leg 504 performs as a DC-DC converter. This functionality is based on an assumption that the power levels for wireless charging are lower than with wired charging (e.g., typically 1.5 times lower). The inductors L4, L3 are high impedance (e.g., high Z) at the operating frequency and thus are an open circuit when the wireless power path is active. The switches SW1, SW3 (with the corresponding diodes D1, D3) in the first phase leg 502 are configured to work as a synchronous rectifier (e.g., an ideal diode rectifier with precisely controlled switches). The switches SW2, SW4 in the second phase leg 504 (with the corresponding diodes D2, D4) act as a regular buck converter. Thus, when the circuit 500 is in wireless mode, the power is received via the receiving coil element, rectified via the first phase leg 502, and converted via the second phase leg 504 (e.g., acting similar to a buck converter in a classic battery charger). When circuit 500 is realized in an integrated circuit and operating in the wireless mode, half the total switch area is used for rectification and half for power conversion. During wired operation, the first and second phase legs 502, 504 act as a multi-phase DC-DC converter. As a result, the switch utilization may be near 100% in either wired or wireless modes.

In wired mode, a DC input is provided (e.g., via the DC input 506) and both the first phase leg 502 and the second phase leg 504 act as a multi-phase buck converter. In operation, the DC-DC switching frequency associated with the switches SW1, SW2, SW3, SW4 may be close to the power transmission frequency. The DC-DC switching frequency may also be above or below the power transmission frequency. The filter element 512 may include EMI and other filters configured to block the fundamental and harmonics of the DC/DC converter operating frequency. In general, the switching frequency should be a value lower than the operating frequency so that the harmonics will be filtered by the same EMI filter that is used by the wireless system. The DC-DC switching frequency may be higher or close to the wireless power transfer frequency, but additional filtering may be required to compensate for potential EMI issues. In addition to the charging capabilities described above (i.e., receiving power from wired or wireless sources), the circuit 500 also may be utilized to provide power from a battery to a charging port. The circuit 500 may be used as a boost converter to provide a DC output (e.g., power signal) from the battery (i.e., the load R3) to the DC input 506 (e.g., a USB port). For example, if the load (e.g., R3) is a battery, then the circuit 500 becomes a boost converter (i.e., to reverse the power flow direction) configured to provide a regulated amount of voltage to a USB On-The-Go (OTG) port (i.e., the DC in 506).

Figure 6A:
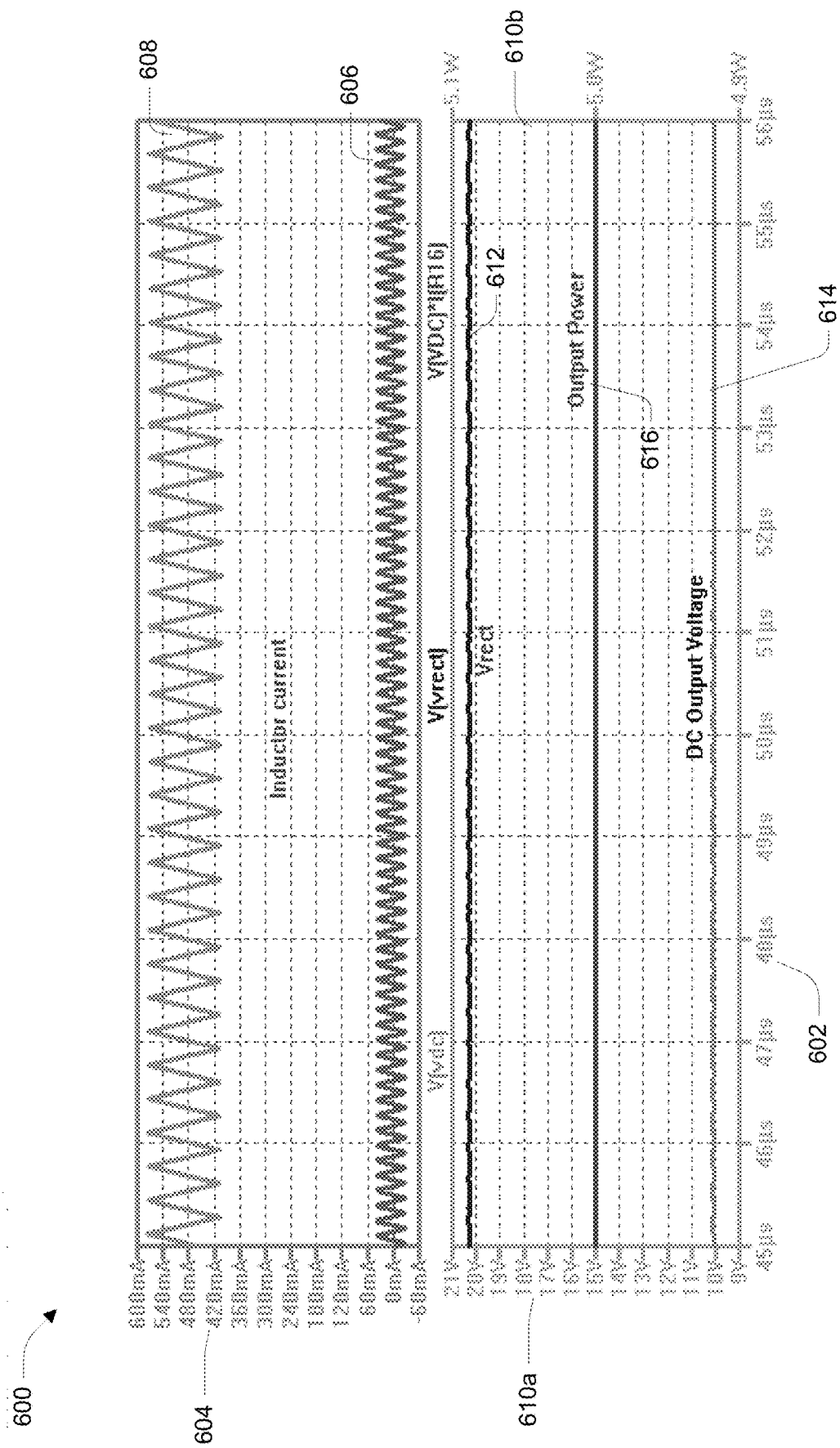
FIGS. 6A and 6B are graphical representations of the operation of the half-bridge rectifier in FIG. 5.

Referring to FIG. 6A, with further references to FIG. 5, a multi-variable graphical representation 600 of the half-bridge rectifier of FIG. 5 operating in a wireless mode is shown. The graph 600 includes a time axis 602, a current axis 604, a voltage axis 610a and a power axis 610b. The values provided in the graph 600 are based on a consumer device with a wireless power transfer frequency of 6.78 MHz and a DC-DC switching frequency of approximately 3 MHz. The values are not limitations and are provided as an example of the functional operation of the circuit 500. A first value plot 606 indicates the value of current across the inductor L4 in the first phase leg 502, and a second value plot 608 indicates the value of current across the inductor L3 in the second phase leg 504. A third value plot 612 indicates the value of the rectified voltage when measured between the output of first phase leg 502 and ground (0V) (i.e., between D1 and Ground). A fourth value plot 614 indicates the output voltage as measured across R3, and a fifth value plot 616 indicates an output power of 5 W based on the voltage and current across R3.

Figure 6B:
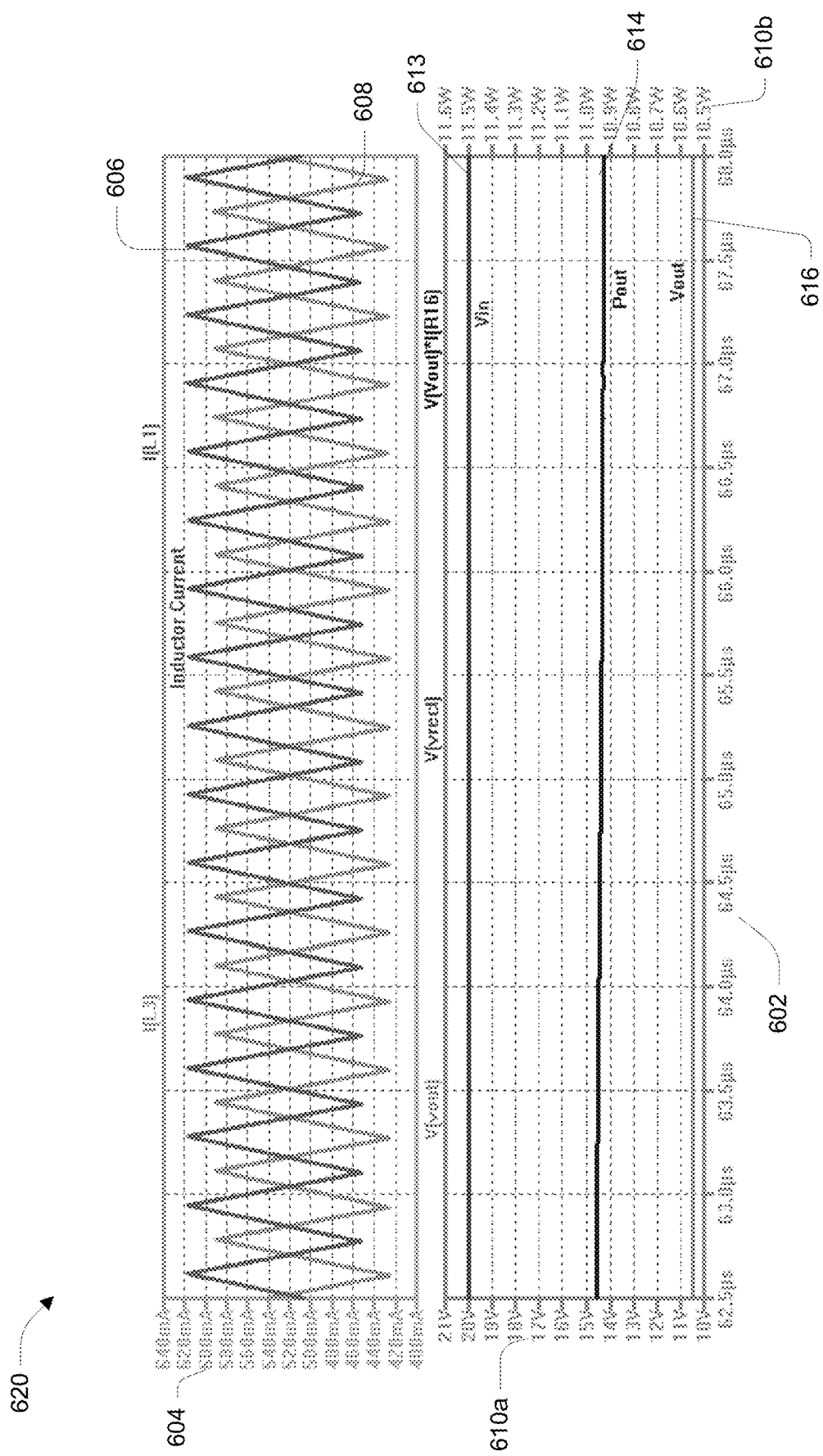

Referring to FIG. 6B, with further references to FIGS. 5 and 6A, a multi-variable graphical representation 620 of the half-bridge rectifier of FIG. 5 operating in a wired mode is shown. The graph 620 includes the time axis 602, the current axis 604, the voltage axis 610a and the power axis 610b. The first value plot 606 indicates the value of current across the inductor L4 in the first phase leg 502, and the second value plot 608 indicates the value of current across the inductor L3 in the second phase leg 504. When operating in wired mode, the currents across the two inductors L3, L4 are phase shifted and thus the first phase leg 502 and the second phase leg 504 act like a multi-phase DC-DC converter. The third value plot 613 indicates the value of the DC input voltage (e.g., at the DC input 506). A fourth value plot 614 indicates the output voltage as measured across R3. Since both phase legs 502, 504 are being used for the power conversion, the wired mode of operation can handle more power than wireless mode (i.e., there are twice the number of switches and inductors available for power conversion). For example, the fifth value plot 616 indicates an increased output power of approximately 11 W based on the voltage and current across R3.

Figure 7:
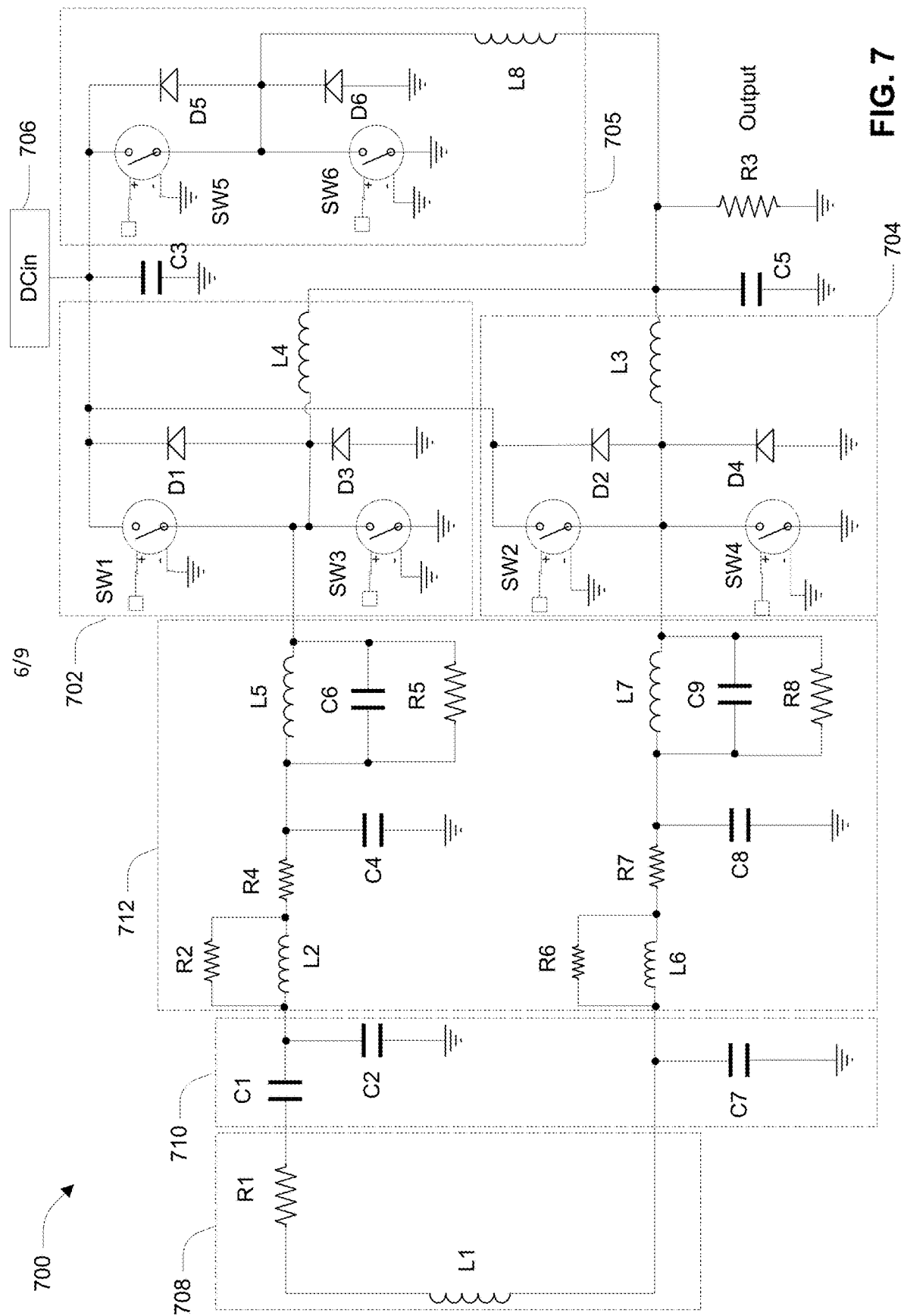
FIG. 7 is a schematic diagram of an example a full-bridge rectifier for wired and wireless charging.

Referring to FIG. 7, with further reference to FIGS. 2-5, a schematic diagram of an example full-bridge rectifier circuit 700 for wired and wireless charging is shown. The circuit 700 may be included in a receiver 208. The full-bridge configuration in the circuit 700 provides a balanced system (i.e., similar filters on both sides of the receiving coil L1). A balanced system typically improves the EMI characteristics of the circuit. The circuit 700 provides a multi-phased DC-DC power converter solution with a first phase leg 702 (i.e., SW1, D1, SW3, D3, L4), a second phase leg 704 (i.e., SW2, D2, SW4, D4, L3), and a third phase leg 705 (i.e., SW5, D5, SW6, D6, L8). The first, second and third phase legs 702, 704, 705 are generally configured as a multi-phase buck converter. The switches SW1, SW2, SW3, SW4, SW5, SW6 may be MOSFETs or other switch devices operably coupled to a control element (e.g., the control and driver element 410) and driven at a switching frequency. The circuit 700 also includes a DC input 706, a wireless receiving coil element 708, a tuning element 710, and a balanced filter element 712. The circuit 700 is a generalized circuit model to demonstrate the operation of a reconfigurable full-bridge rectifier for wired and wireless charging. Other circuits and components may be used. The specifications of the components in the circuit 700 may be varied based on the application and the corresponding power output expectations. The wireless receiving coil element 708 may be modeled as a first inductance L1 and a first resistance R1. The values of L1 and R1 may be based on the characteristics of the receive coil. The tuning element 710 includes one or more capacitive elements such as capacitors C1, C2, C7. Other capacitive elements such as variable capacitors, varactors, transcaps, and barium strontium titanate (BST) devices may be used. The balanced filter element 712 may be an EMI filter including low pass filter components (R2, L2,R4, C4, R6, L6, R7,C8) and a notch filter component (L5, C6, R5, L7, C9, R8). The design of the balanced filter element 712 is based on the switching frequency in the first, second and third phase legs 702, 704, 705 of the DC-DC power converter. The balanced filter element 712 presents a high impedance to the fundamental and harmonics of the DC/DC converter switching frequency while providing low impedance at the wireless power transfer frequency. The circuit 700 includes two smoothing capacitors C3, C5 on the DC input 706 and output respectively. The values and configurations of the elements in the circuit 700 may be consistent with the examples provided in FIG. 5, but may also vary based on application requirements (e.g., power transfer frequency, power output, coil size, etc.).

During wireless operation, the first and second phase legs 702, 704 perform as a full-bridge synchronous rectifier, and the third phase leg 705 performs as a single phase buck converter. The inductors L4, L3, L8 are high impedance (e.g., high Z) at the operating frequency and thus are an open circuit when the wireless power path is active. When the circuit 700 is in wireless mode, the power is received via the receiving coil element, rectified via the first and second phase legs 702, 704 and converted via the third phase leg 705.

In wired mode, a DC input is provided (e.g., via the DC input 706) and the first, second and third phase legs 702, 704, 705 act as a multi-phase buck converter. The balanced filter element 712 may be configured to block the fundamental and harmonics of the switching frequency. The switching frequency associated with the first, second and third phase legs 702, 704, 705 should be a value that approximately the same (e.g., +/−1 MHz) as the wireless power transfer frequency. The switching frequency may be higher or lower than power transfer frequency, but additional filtering may be required to compensate for potential EMI issues. In addition to the charging capabilities described above (i.e., receiving power from wired or wireless sources), the circuit 700 also may be utilized to provide power from a battery to a charging port. For example, if the load (e.g., R3) is a battery, then the circuit 700 becomes a boost converter (i.e., to reverse the power flow direction) configured to provide a regulated amount of voltage to a USB or other peripheral port (i.e., the DC in 706).

Figure 8A:
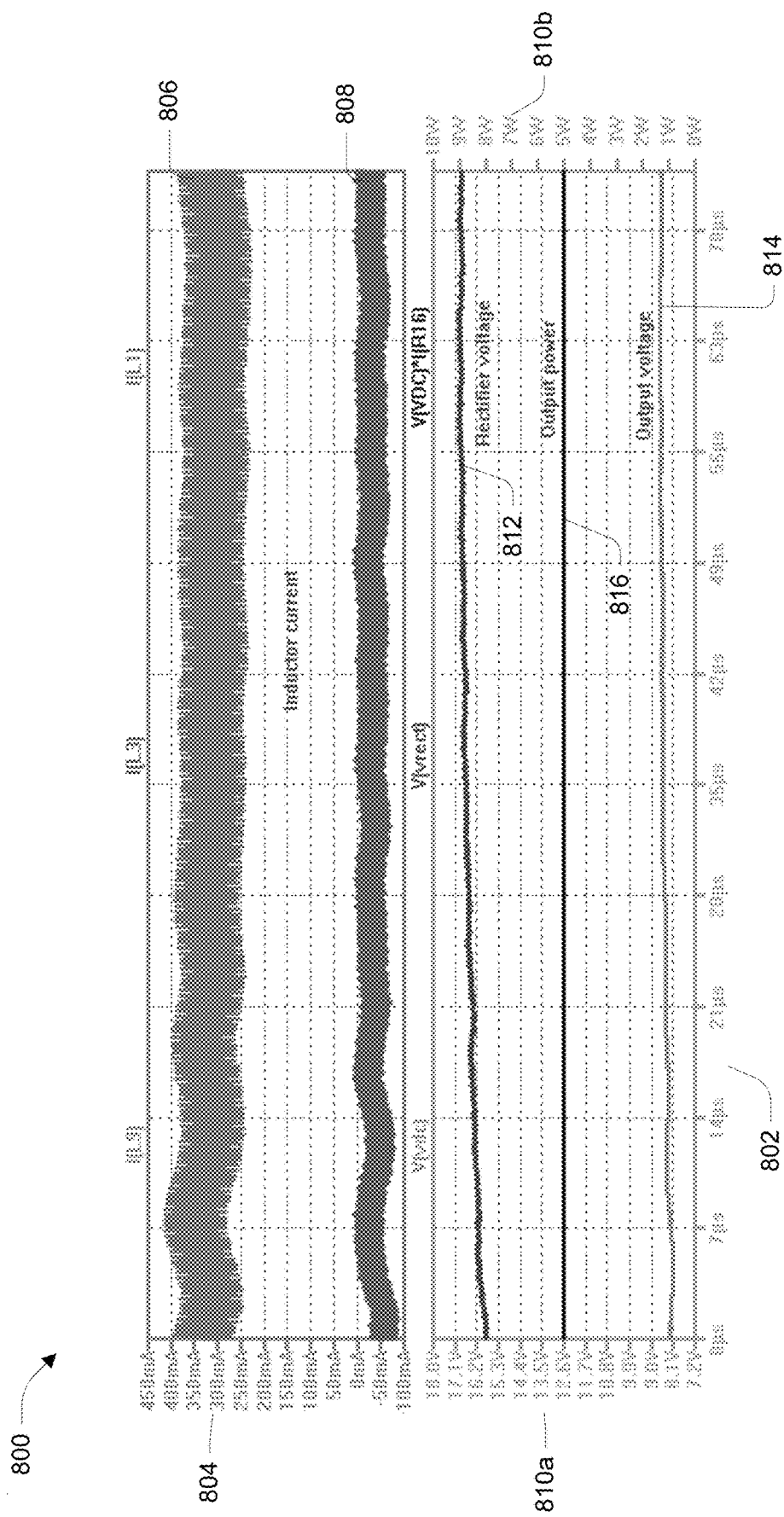
FIGS. 8A and 8B are graphical representations of the operation of the full-bridge rectifier in FIG. 7.

Referring to FIG. 8A, with further references to FIG. 7, a multi-variable graphical representation 800 of the full-bridge rectifier of FIG. 7 operating in a wireless mode is shown. The graph 800 includes a time axis 802, a current axis 804, a voltage axis 810a and a power axis 810b. The values provided in the graph 800 are based on a consumer device with a wireless power transfer frequency of 6.78 MHz and a DC-DC switching frequency of approximately 3 MHz. A first value plot 808 indicates the value of current across the inductor L3 and L4 in the first phase leg 702, and a second value plot 806 indicates the value of current across the inductor L8 in the third phase leg 705. A third value plot 812 indicates the value of the rectified voltage when measured between the output of first phase leg 702 and the input to the second phase leg 704 and the input of the third phase leg 705 (i.e., between D1 and C3). An output voltage value plot 814 indicates the output voltage as measured across R3, and an output power value plot 816 indicates an output power of 5 W based on the voltage and current across R3.

Figure 8B:
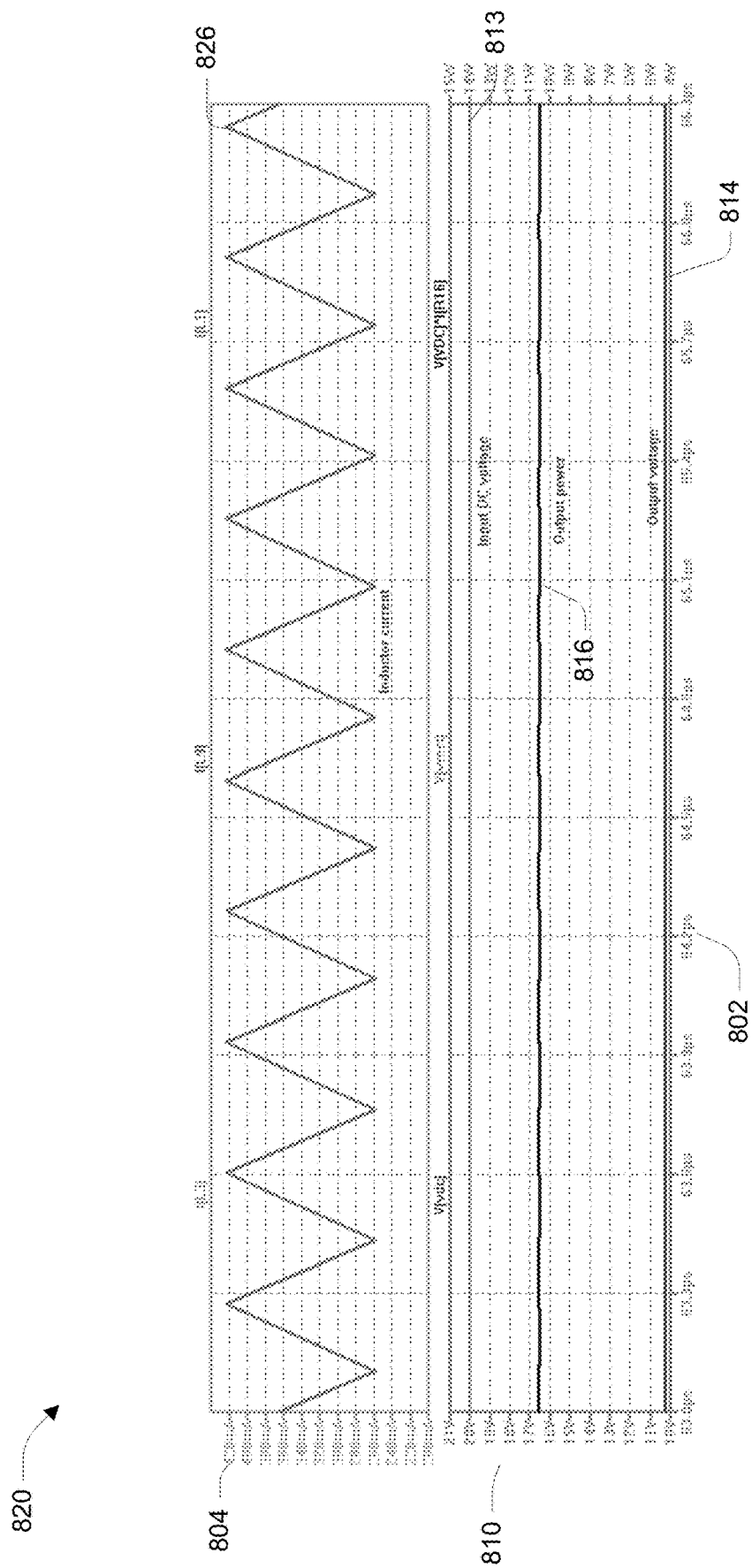

Referring to FIG. 8B, with further references to FIGS. 7 and 8A, a multi-variable graphical representation 820 of the full-bridge rectifier of FIG. 7 operating in a wired mode is shown. The graph 820 includes the time axis 802, the current axis 804, the voltage axis 810a and the power axis 810b. In the wired mode, the first, second and third phase legs 702, 704, 705 are used to implement a multi-phase buck converter. In an example, a coupled inductor may be used. A first wired value plot 826 indicates the value of current across the inductor L4, L3 and L8 in the first phase leg 702. The second value plot 813 indicates the value of the DC input voltage (i.e., at the DC input 706). The output voltage value plot 814 indicates the output voltage as measured across R3, and the output power value plot 816 indicates an output power of approximately 11 W based on the voltage and current across R3.

Figure 9:
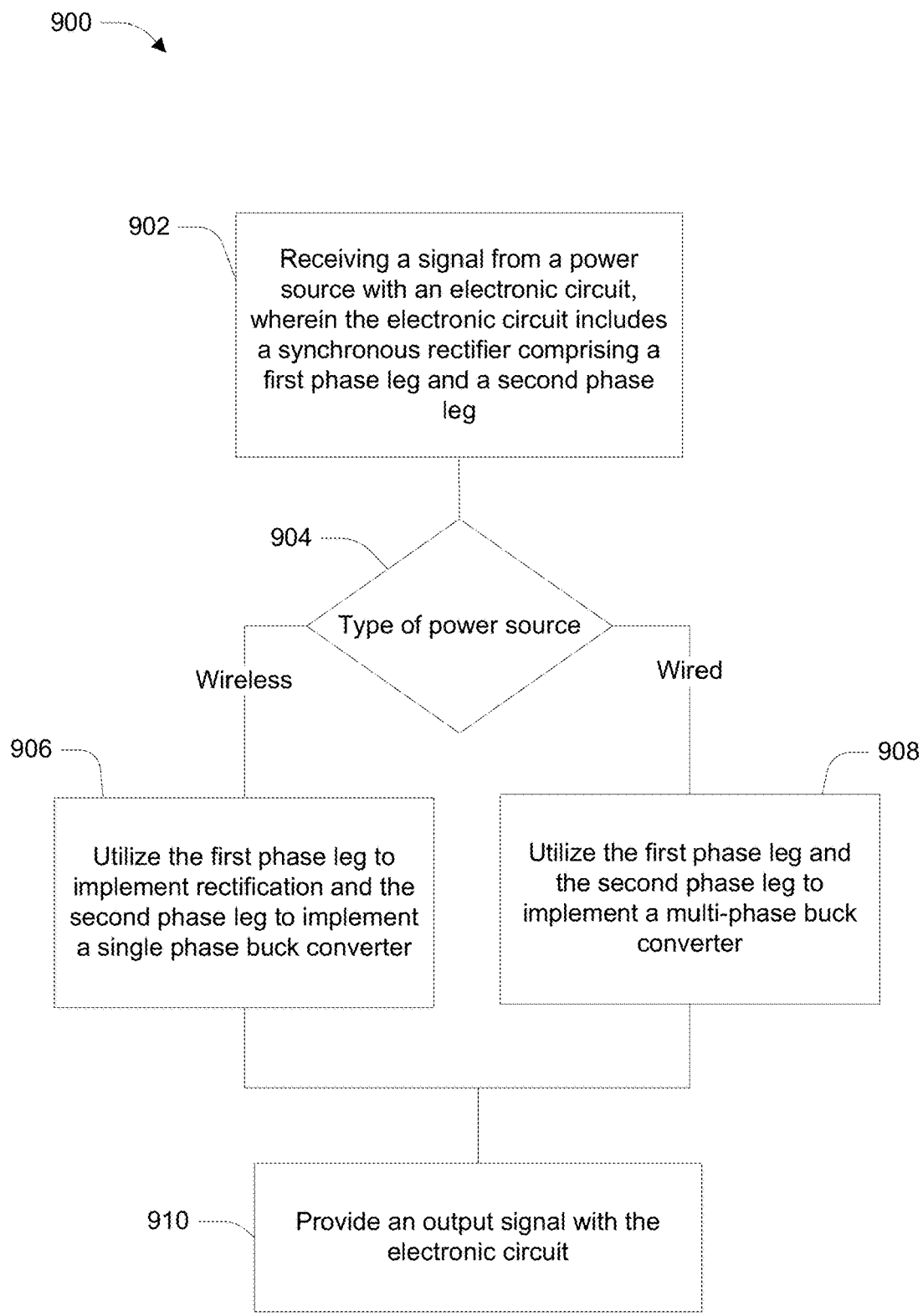
FIG. 9 is a flowchart of an example of a method for providing an output from a circuit based on either a wired or wireless power source.

Referring to FIG. 9, with further reference to FIGS. 2, 4, 5 and 7, an example of a method 900 for providing an output from a circuit based either a wired or wireless power source is shown. The method 900 is, however, an example only and not limiting. The method 900 can be altered, e.g., by having stages added, removed, rearranged, combined, performed concurrently, and/or having single stages split into multiple stages. The half-bridge and full-bridge circuit topologies described in FIGS. 5 and 7 are examples of means for performing the elements of the method 900.

At stage 902, the method includes receiving a signal from a power source with an electronic circuit, wherein the electronic circuit includes a synchronous rectifier comprising a first phase leg and a second phase leg. In an example, the circuit 500 includes a wireless receiving element 508 and tuning element 510 configured to receive a time varying signal 205 from a transmitter 204. The circuit 500 also includes a DC input 506 configured to receive a DC signal (e.g., voltage) from a wired power source. The wireless receiving element 508 and the DC input 506 may be a means for receiving a signal from a power source. In a typical consumer product, the time varying signal 205 may be an alternating signal at a frequency of 6.78 MHz and the wired DC input may be 5V received via a USB connector. Other frequencies and voltages may be used. For example, the circuit 500 may be used for Wireless Electric Vehicle Charging (WEVC) and the frequencies, voltages and connectors may comport with industry standards (e.g., 80-90 kHz, 12-20 volts, etc.). The circuit 500 is an example of synchronous rectifier including a first phase leg 502 and a second phase leg 504. Each of the phase legs 502,504 includes one or more high speed switching circuits and inductors based on the desired operating frequency. The switches (e.g., SW1, SW2, SW3, SW4) are operably coupled to a control and driver element 410 and may be driven to implement signal rectification and DC-DC conversion (e.g., as a buck converter). In an example, the switches may also be driven as boost converter to reverse the power flow from a battery to a USB port.

At stage 904, the method includes determining the type of power source that is being received. The circuit 500 may include signal sensors (e.g., voltage sensors) in the wireless receiving element 508, the DC input 506, and the output that are coupled to the control and driver element 410. The signal sensors may be a means for detecting if a power source is wireless or a wired power source. The control and driver element 410 is configured to implement an appropriate switching control based on the detected input. If a wireless power source is detected via the wireless receiving element 508, or elsewhere within the circuit 500, the control and driver element 410 is configured to drive the switches as described at stage 906. If a wired power source is detected via the DC input 506, then the control and driver element 410 is configured to drive the switches as described at stage 908. In an embodiment, if a signal is received at an output (e.g., R3), the control and driver element 410 may be configured to drive the switches to implement a boost converter and provide a DC output voltage to the DC input 506.

At stage 906, the method includes utilizing the first phase leg to implement rectification and the second phase leg to implement a single phase buck converter. The first phase leg 502 receives an AC input from the wireless receiving element 508 via the filter element 512. The switching elements in the first phase leg 502 are driving by the control and driver element 410 to perform a half-bridge rectification on the AC signal. The rectified signal output from the first phase leg 502 is received by the second phase leg 504. The control and driver element 410 drives the second phase leg switching element to perform a DC-DC conversion (e.g., a buck conversion base on L3). The converted DC signal is provided to the output signal at stage 910. The control and driver element 410 may be a means for utilizing the first phase leg to implement synchronous rectification and the second phase leg to implement a single phase buck converter.

At stage 908, the method includes utilizing the first phase leg and the second phase leg to implement a multi-phase buck converter. The first and second phase legs 502, 504 receive a DC signal from the DC input 506. The control and driver element 410 drives the switching elements (SW1, SW2, SW3, SW4) to implement a DC-DC conversion and provide a converted DC output at stage 910. The inductors in the first and second phase leg (L3, L4) may be implemented as coupled inductors to improve integration and performance for some applications. The filter element 512 is configured to provide high impedance based on the frequency of the switching elements and reduce potential electrical losses in the wired mode. For example, the filter element 512 may be designed to block the fundamental frequency and harmonics associated with the switching frequency. The output signal at stage 910 is typically a DC signal and may be used to charge a battery or operate an electronic device. A connection port, terminal, or conductor may be a means for providing an output signal with the electronic circuit.

The method 900 may also be implemented with the full-bridge circuit 700 depicted in FIG. 7. In a full-bridge topology in a wireless mode at stage 906, two phase legs (e.g., the first and second phase legs 702, 704) are used to implement a synchronous rectifier, and the third phase leg 705 is used to implement a single phase buck converter. In a wired mode at stage 908, all three phase legs 702, 704, 705 are used to implement a multi-phase buck converter. The both the half-bridge and full-bridge topologies, one or more legs in the multi-phase buck converters may be shut-off to improve circuit efficiency at light loads. In both the half-bridge and full-bridge topologies, the control and driver element 410 may be a means for utilizing the first phase leg and the second phase leg to implement a multi-phase buck converter.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. An apparatus for converting an input from a wireless or wired power source, comprising:
   a wireless receiving element;
   a direct current (DC) input;
   a first phase leg operably coupled to the wireless receiving element and the DC input, wherein the first phase leg includes one or more switches and a first inductor;
   a second phase leg operably coupled to the first phase leg, wherein the second phase leg includes one or more switches and a second inductor;
   an output operably coupled to the second phase leg;
   a control element operably coupled to the first phase leg and the second phase leg, wherein the control element is configured to:
      utilize the one or more switches in the first phase leg to rectify a signal received via the wireless receiving element, and utilize the one or more switches in the second phase leg to perform a DC-to-DC conversion of the rectified signal; and
      utilize the one or more switches in the first phase leg and the second phase leg to perform the DC-to-DC conversion of a DC signal received via the DC input.

2. The apparatus of claim 1 further comprising a filter element operably coupled to the wireless receiving element and the first phase leg.

3. The apparatus of claim 2 wherein the one or more switches in the first phase leg are driven to operate at a switching frequency and the filter element is configured to provide a high impedance at the switching frequency.

4. The apparatus of claim 2 wherein the filter element includes one or more variable reactive elements.

5. The apparatus of claim 4 wherein the control element is operably coupled to the filter element and configured to vary an impedance value of the one or more variable reactive elements.

6. The apparatus of claim 1 wherein the control element is operably coupled to the wireless receiving element and the DC input and configured to determine if the input is a wireless input or a wired input.

7. The apparatus of claim 1 wherein a wireless power input is received at a power transfer frequency and the control element is configured to drive the one or more switches at a switching frequency that is within +/−1 MHz of the power transfer frequency.

8. The apparatus of claim 1 wherein the output is a battery and the control element is configured to utilize the one or more switches in the first phase leg and the second phase leg as a boost converter to provide a power signal to the DC input.

9. The apparatus of claim 1 wherein the first inductor and the second inductor are implemented as a coupled inductor.

10. A method for providing an output from a circuit, comprising:
  receiving a signal from a power source with an electronic circuit, wherein the electronic circuit includes a synchronous rectifier comprising a first phase leg and a second phase leg;
  utilizing the first phase leg to implement synchronous rectification and the second phase leg to implement a single phase buck converter when the signal is a wireless signal received from the power source;
  utilizing the first phase leg and the second phase leg to implement a multi-phase buck converter when the signal is received from a wired power source; and
  providing an output signal with the electronic circuit.

11. The method of claim 10 further comprising detecting if the power source is a wireless power source or the wired power source.

12. The method of claim 10 wherein the electronic circuit is configured to receive the wireless signal at a power transfer frequency and utilizing the first phase leg and the second phase leg to implement the multi-phase buck converter comprises operating one or more switches at a switching frequency that is within +/−1 MHz of the power transfer frequency.

13. The method of claim 10 wherein the first phase leg or the second phase leg implements the single phase buck converter when the signal is received from the wired power source.

14. An apparatus for converting an input from a wireless or wired power source, comprising:
  a wireless receiving element;
  a direct current (DC) input;
  a first phase leg operably coupled to the wireless receiving element and the DC input, wherein the first phase leg includes one or more switches and a first inductor;
  a second phase leg operably coupled to the first phase leg, wherein the second phase leg includes one or more switches and a second inductor;
  a third phase leg operably coupled to the first phase leg, wherein the third phase leg includes one or more switches and a third inductor;
  an output operably coupled to the first, second and third phase legs;
  a control element operably coupled to the first, second and third phase legs, wherein the control element is configured to:
    utilize the one or more switches in the first phase leg and the second phase leg to rectify a signal received via the wireless receiving element, and utilize the one or more switches in the third phase leg to perform a DC-to-DC conversion of the rectified signal; and
    utilize the one or more switches in the first, second and third phase legs to perform the DC-to-DC conversion of a DC signal received via the DC input.

15. The apparatus of claim 14 wherein the control element is operably coupled to the wireless receiving element and the DC input and configured to determine if the input is a wireless input or a wired input.

16. The apparatus of claim 14 wherein the signal received via the wireless receiving element is received at a power transfer frequency and the control element is configured to drive the one or more switches at a switching frequency that is within +/−1 MHz of the power transfer frequency.

17. The apparatus of claim 14 wherein the output is a battery and the control element is configured to utilize the one or more switches in the first, second or third phase legs as a boost converter to provide a power signal to the DC input.

18. The apparatus of claim 14 wherein the one or more switches in only one of the first, second and third phase legs are utilized to perform the DC-to-DC conversion of the DC signal received via the DC input.

19. The apparatus of claim 14 wherein the one or more switches in only two of the first, second and third phase legs are utilized to perform the DC-to-DC conversion of the DC signal received via the DC input.

20. An apparatus, comprising:
  means for receiving a signal from a power source with an electronic circuit, wherein the electronic circuit includes a rectifier means comprising a first phase leg and a second phase leg;
  means for utilizing the first phase leg to implement synchronous rectification and the second phase leg to implement a single phase buck converter when the signal is a wireless signal received from the power source;
  means for utilizing the first phase leg and the second phase leg to implement a multi-phase buck converter when the signal is received from a wired power source; and
  means for providing an output signal with the electronic circuit.

21. The apparatus of claim 20 further comprising means for detecting if the power source is a wireless power source or the wired power source.

22. The apparatus of claim 20 wherein the electronic circuit is configured to receive the wireless signal at a power transfer frequency and utilizing the first phase leg and the second phase leg to implement the multi-phase buck converter comprises operating one or more switches at a switching frequency that is within +/−1 MHz of the power transfer frequency.

23. The apparatus of claim 20 wherein the first phase leg or the second phase leg implements the single phase buck converter when the signal is received from the wired power source.

* * * * *